(12) United States Patent
Drewitz et al.

(10) Patent No.: US 6,244,429 B1
(45) Date of Patent: Jun. 12, 2001

(54) AUTOMATIC ADJUSTABLE GUIDE RAILS

(75) Inventors: Huques Drewitz, St-Eustache; Jody Anthony D'Amico, Ville Lasalle, both of (CA)

(73) Assignee: Kalish Canada Inc., Montreal (CA)

( * ) Notice: Subject to any disclaimer, the term of this patent is extended or adjusted under 35 U.S.C. 154(b) by 0 days.

(21) Appl. No.: 09/304,891

(22) Filed: May 4, 1999

(51) Int. Cl.⁷ .............................. B65G 15/00; B65G 17/00
(52) U.S. Cl. ....................................................... 198/836.3
(58) Field of Search ......................................... 198/836.3

(56) References Cited

U.S. PATENT DOCUMENTS

| | | | |
|---|---|---|---|
| 2,951,574 | * 4/1960 | Craig | 198/30 X |
| 3,767,027 | * 10/1973 | Pund et al. | 198/32 X |
| 4,225,035 | 9/1980 | Mohney et al. | |
| 4,880,104 | * 11/1989 | Evans et al. | 198/445 X |
| 5,515,668 | * 5/1996 | Hunt et al. | 53/543 |
| 5,520,276 | 5/1996 | Aoki et al. | |
| 5,636,127 | 6/1997 | Aoki et al. | |
| 5,749,698 | 5/1998 | Miyoshi | |
| 5,782,339 | 7/1998 | Drewitz | |
| 6,050,396 | * 4/2000 | Moore | 198/836.3 |

FOREIGN PATENT DOCUMENTS 5-97220   10/1991   (JP) .

* cited by examiner

Primary Examiner—Joseph E. Valenza
Assistant Examiner—Kenneth W Bower
(74) Attorney, Agent, or Firm—Ratner & Prestia

(57) ABSTRACT

An adjustable guide rail system for guiding containers transported on a conveyor in a container processing production line that allows adjustment of the distance between the opposing guide rails to accommodate containers of different dimensions and configurations. The adjustable guide rail system comprises sections of guide rail, a reversible motorized actuator and a motion converter driven by said reversible motorized actuator which is coupled to the sections of guide rail to automatically adjust the width of the path of the containers being transported on the conveyor.

29 Claims, 8 Drawing Sheets

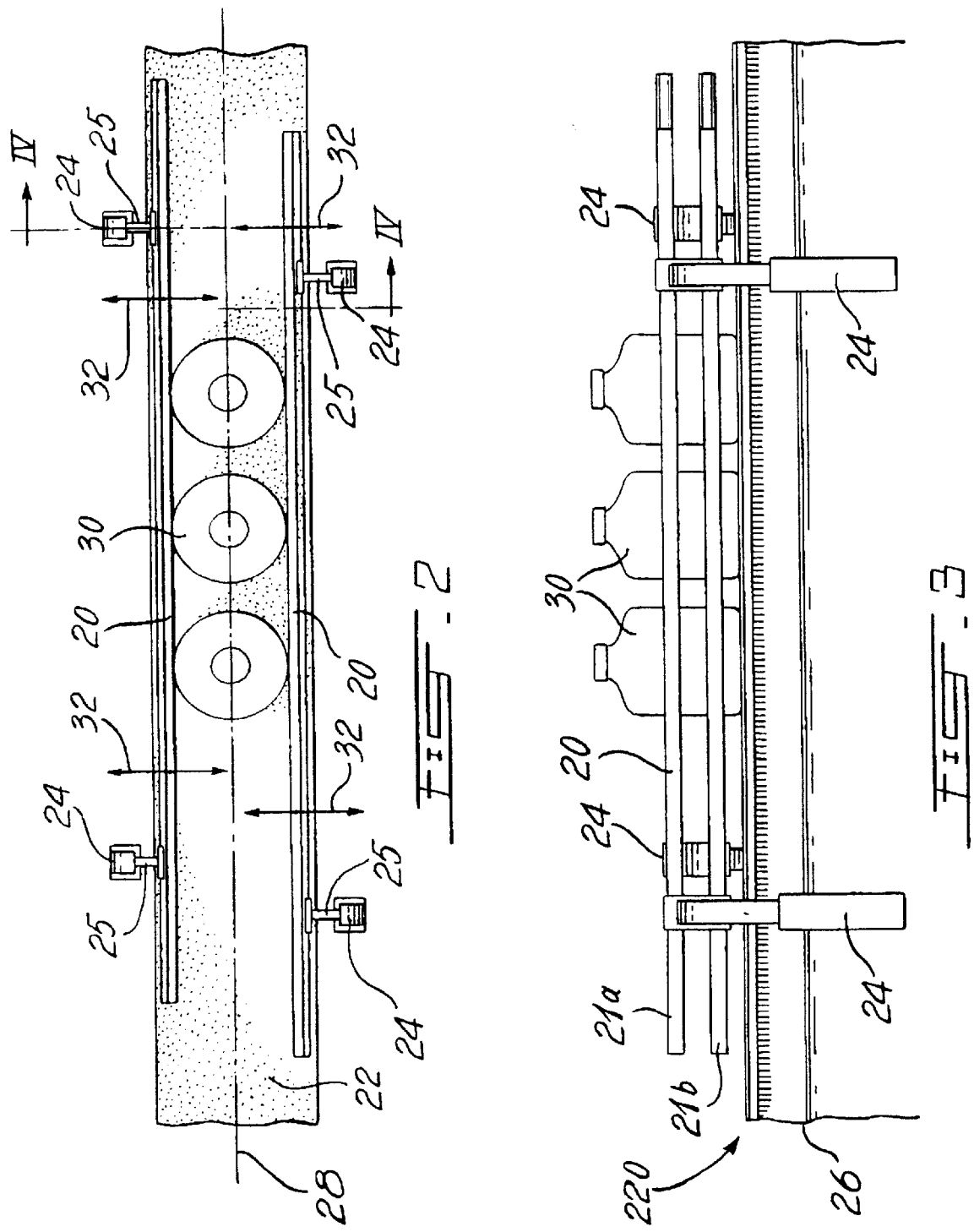

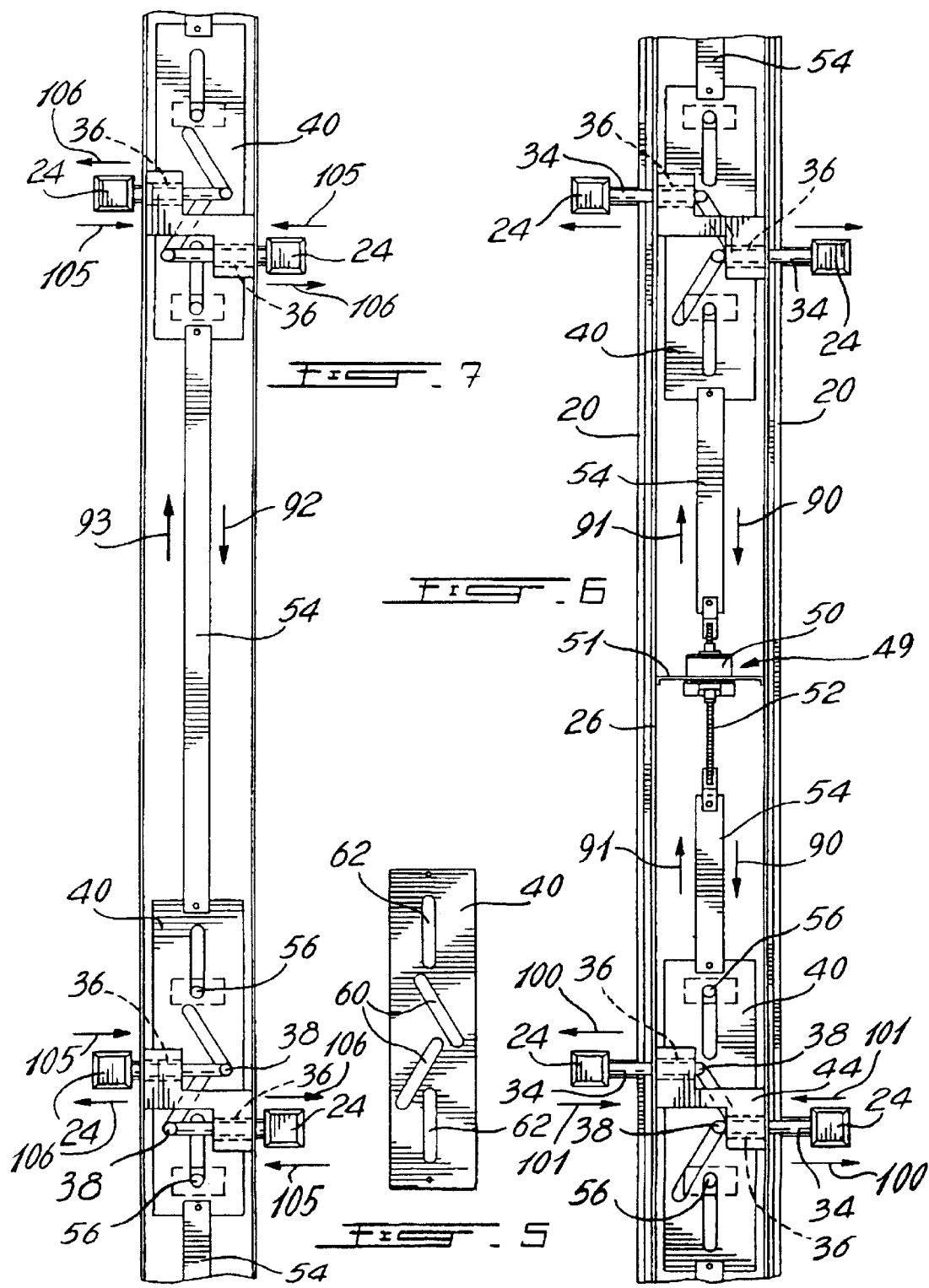

AUTOMATIC ADJUSTABLE GUIDE RAILS

FILED OF THE INVENTION

The invention relates to guide rail systems for guiding containers transported on a conveyor in a packaging line or container processing production line and more particularly to guide rail systems that allow adjustment of the distance between the opposing guide rails to accommodate containers of different dimensions and configurations.

BACKGROUND OF THE INVENTION

In the container industry, conveyor systems are used to transport containers between various processing stations. Guide rails are typically provided on the sides of the conveyor to ensure that containers will remain in line along the path of travel established by the conveyor belt. The guide rails that are commonly used in the industry can be adjusted to accommodate different container sizes by using simple manual knobs. To perform the adjustment procedure, the operator releases the knobs, positions the guide rail manually at the desired position and then tightens the knobs to lock the guide rails in place. Conventional guide rail systems, however, fail to provide a quick means of adjusting the distance between opposing guide rails. An operator must physically go to each guide rail sections and manually adjust the distance between the guide rail and the center of the conveyor belt or between opposing guide rails. An operator must repeat this procedure for each section of guide rails and on both sides of the conveyor belt. Considering that production lines may have numerous sections to adjust, it may represent an enormous amount of set up time during which the production line is inactive. If a production line is subject to multiple changes of container sizes due to the nature of the industry, the loss of production time is compounded making the production line less efficient.

Thus there is a need in the industry to provide a guide rail adjustment system for conveyor belt that can rapidly be adjusted to accommodate containers of various sizes.

OBJECTS AND STATEMENT OF THE INVENTION

It is an object of the invention to provide an adjustable guide rail system for conveyor belt that can rapidly be adjusted to accommodate containers of various sizes.

As embodied and broadly described herein, the invention provides a selfpowered adjustable guide rail system for guiding containers transported on a conveyor in a container processing production line. The adjustable guide rail system usually comprises at least two sections of guide rail, one on each side of the conveyor for guiding containers, the sections of guide rail are mounted to the conveyor in a generally parallel, facing and coextensive relationship, and are adjustably movable toward the longitudinal centerline of the conveyor or away therefrom. It also comprises a reversible motorized actuator; a motion converter driven by the reversible motorized actuator and coupled to the sections of guide rail for moving same toward the centerline when the actuator operates in a first direction, and for moving the sections of guide rail away from the centerline when the actuator operates in a second direction, thereby adjusting the width of the path of the containers being transported on the conveyor.

Advantageously, the self-powered adjustable guide rail system further comprises control means generating an output signal representative of the required motion of the sections of guide rail, the output signal being applied to the motorized actuator and causing same to move to a predetermined setting relative to the centerline.

Preferably, the motion converter comprises a cam member movable longitudinally and having a pair of diverging grooves having the same angular deviation relative to the longitudinal centerline. The cam member is connected to the sections of guide rail through inwardly directed sliding members supporting at one end the sections of guide rail and at the other end having cam followers slidably engaging the diverging grooves, thereby transmitting motion of the cam member to each section of guide rail.

As embodied and broadly described herein, the invention also provides a self-powered adjustable double guide rails system for guiding containers transported on a conveyor in a container processing production line, the adjustable guide rails system comprising at least two sections of guide rails, one on each side of said conveyor for guiding containers. The sections of guide rails are mounted to the conveyor in a generally parallel, facing and coextensive relationship, and are adjustably movable toward the longitudinal centerline of the conveyor or away therefrom. Each sections of guide rails further comprises at least two generally parallel, side by side rails. The sections of guide rails define two paths for containers being transported; one section of guide rails define a right side of each path, the other section of guide rails define a left side of each path; It also comprises a reversible motorized actuator; a motion converter driven by the reversible motorized actuator and coupled to the sections of guide rails for moving same toward each other when the actuator operates in a first direction, and for moving the sections of guide rails away from each other when the actuator operates in a second direction, thereby adjusting the width of the path of the containers being transported on the conveyor.

As embodied and broadly described herein, the invention also provides a conveyor system for a container processing production line, having a supporting structure, a conveyor belt mounted to, and supported by the structure and movable along the longitudinal axis of the structure and at least two sections of guide rail disposed above the conveyor belt for guiding containers thereon. The sections of guide rail are supported by the structure in a generally parallel, facing and coextensive relationship, and are adjustably movable toward a longitudinal centerline of the conveyor or away therefrom. The conveyor also comprises a reversible motorized actuator, a motion converter driven by the reversible motorized actuator and coupled to the sections of guide rail for moving the sections of guide rail toward the centerline when the actuator operates in a first direction, and for moving the sections of guide rail away from the centerline when said actuator operates in a second direction, thereby adjusting the width of the path of the containers being transported on the conveyor.

As embodied and broadly described herein, the invention also provides a self-powered adjustable guide rail system for guiding containers transported on a conveyor in a container processing production line comprising at least one movable guide rail disposed above the conveyor for guiding containers thereon. The guide rail is adjustably movable transversely of the conveyor to accommodate containers of different configurations or sizes. It also comprises a reversible motorized actuator and a motion converter driven by the reversible motorized actuator and coupled to the guide rail for moving same in one direction when the actuator operates in a first direction, and for moving the guide rail in the opposite direction when the actuator operates in a second direction, thereby adjusting the path of the containers being transported on the conveyor.

Other objects and features of the invention will become apparent by reference to the following description and the drawings.

BRIEF DESCRIPTION OF THE DRAWINGS

A detailed description of preferred embodiments of the present invention is provided herein below, by way of example only, with reference to the accompanying drawings, in which:

FIG. 2 is a top plan view of the conveyor system of FIG. 1 with containers on the conveyor;

FIG. 3 is a side elevational view of the conveyor system of FIG. 2;

FIG. 5 is a bottom view of a cam member as used in a guide rail system according to the invention;

FIG. 6 is a bottom view of a portion of the guide rail system of FIG. 1;

FIG. 7 is a bottom view of another portion of the guide rail system of FIG. 1;

Figure 1:
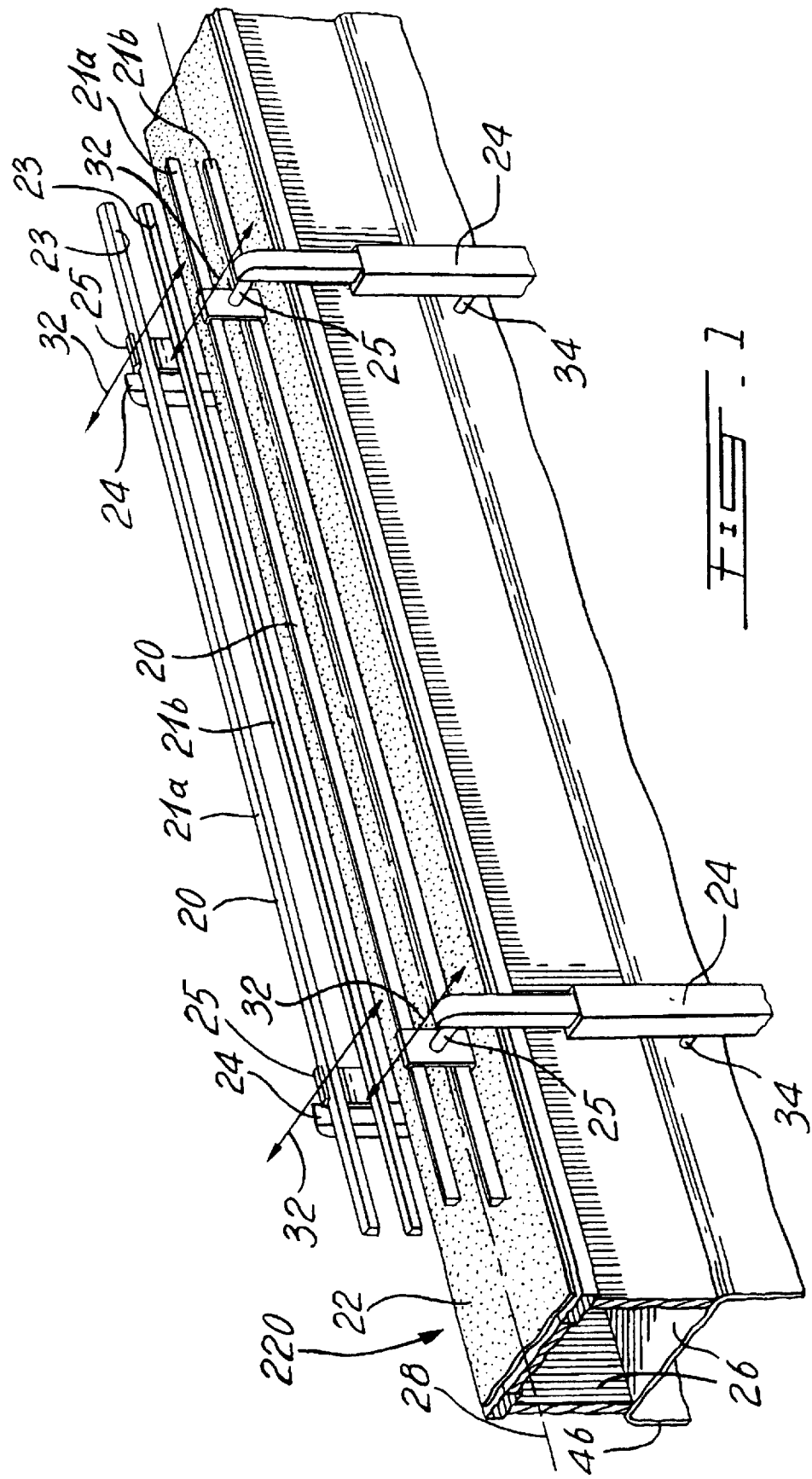
FIG. 1 is a perspective view of a single lane conveyor with a guide rail system according to the invention.

In the drawings, preferred embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF PREFERRED EMBODIMENTS

FIGS. 1, 2 and 3 show a section of a single lane conveyor 220 adapted to transport containers 30 to and from a processing station(not shown) in a packaging line such as used in the pharmaceutical or cosmetic industry. Conveyor 220 has a conveyor belt 22 of any suitable design mounted to a supporting structure 26 and movable along the longitudinal axis of supporting structure 26. The supporting structure 26 also features legs (not shown) resting on the floor and stabilizing the structure. Guide rail sections 20 are located one on each side of conveyor belt 22 and each guide rail 20 has a pair of parallel rails 21a and 21b each having a contacting surface 23 facing inwardly toward longitudinal centerline 28. Rails 21a and 21b guide and prevent containers 30 from falling off conveyor 22. Only two guide rail sections 20 are shown in FIG. 1 to simplify the illustration. However, in a normal packaging line, a succession of guide rail sections will be used almost the entire length of conveyor 220 to insure proper guiding of containers 30 between processing stations.

Guide rail sections 20 are secured to uprights 24 by holders 25 which maintain the guide rail sections 20 at a predetermined height above conveyor 220.

Uprights 24 are retained to supporting structure 26 by sliding arms 34. Guide rail sections 20 are movable toward or away from longitudinal centerline 28 and provide adjustment for the various sizes and configurations of containers 30. Arrows 32 indicate the general direction of motion of each guide rail section 20.

An actuating mechanism which will be described in detail further down, is located underneath an inverted U-shaped shroud 46 which is part of supporting structure 26 and protects the mechanism from any spillage that may occur on conveyor 220. Sliding arms 34 extend through shroud 46 and are linked to the actuating mechanism and to uprights 24. Sliding arms 34 transfer the necessary motion to guide rail sections 20 in order to adjust the distance therebetween.

Figure 4:
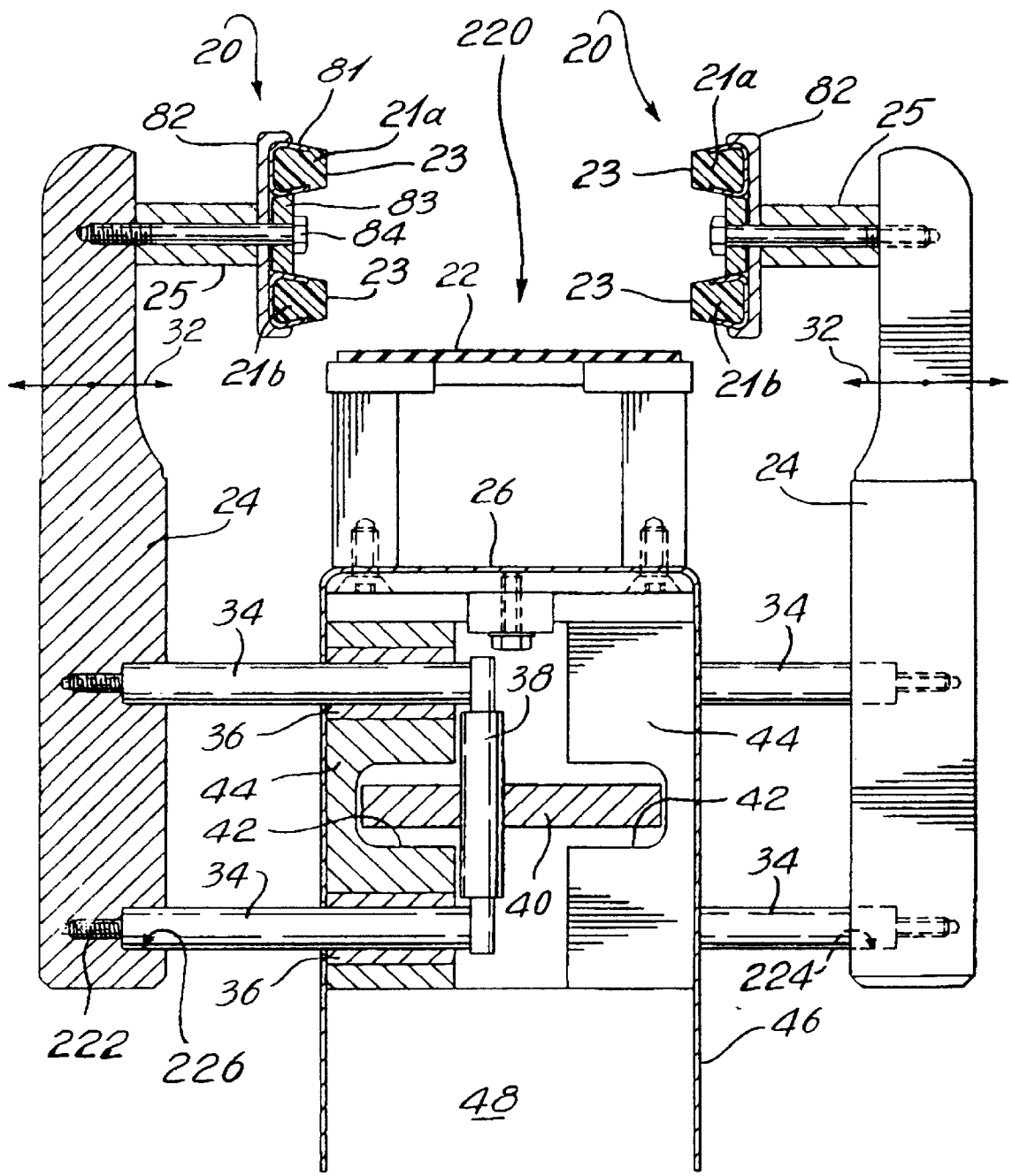
FIG. 4 is a sectional view taken along line 4—4 of the conveyor system of FIG. 2.
Figure 8:
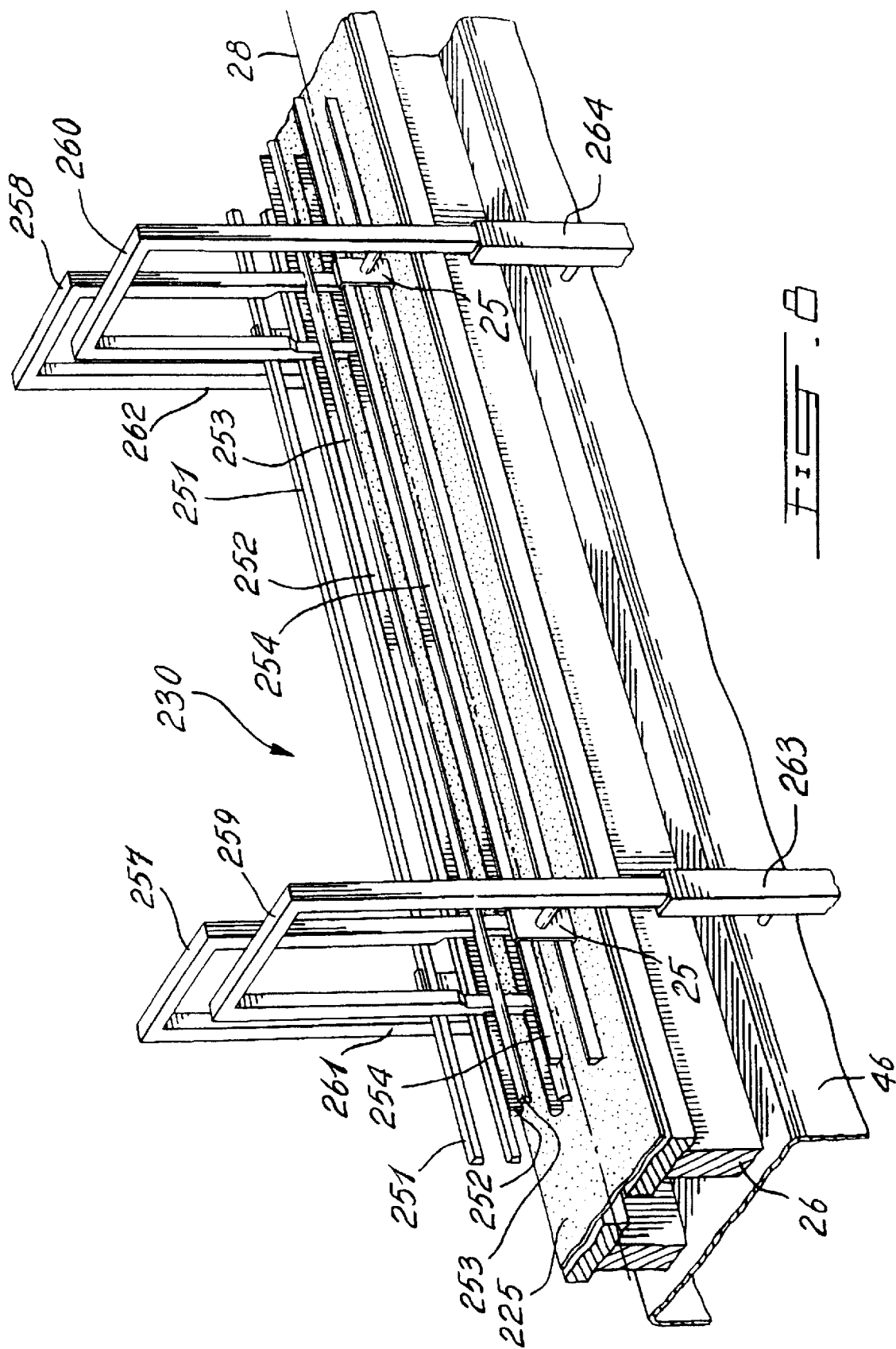
FIG. 8 is a perspective view of a dual lane conveyor with a guide rail system according to the invention.
Figure 9:
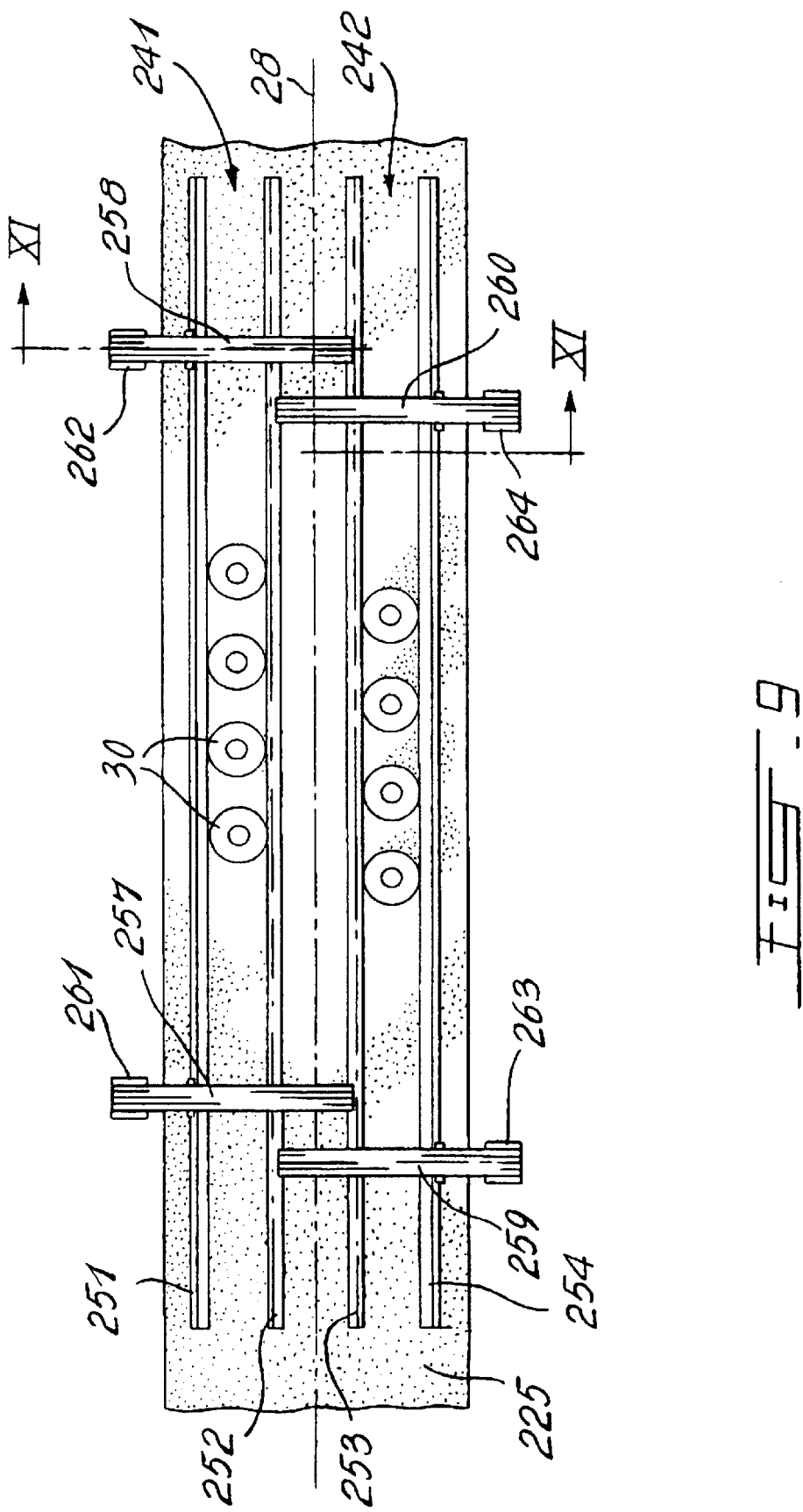
FIG. 9 is a top plan view of the guide rail system of FIG. 8 with containers on the conveyor.
Figure 10:
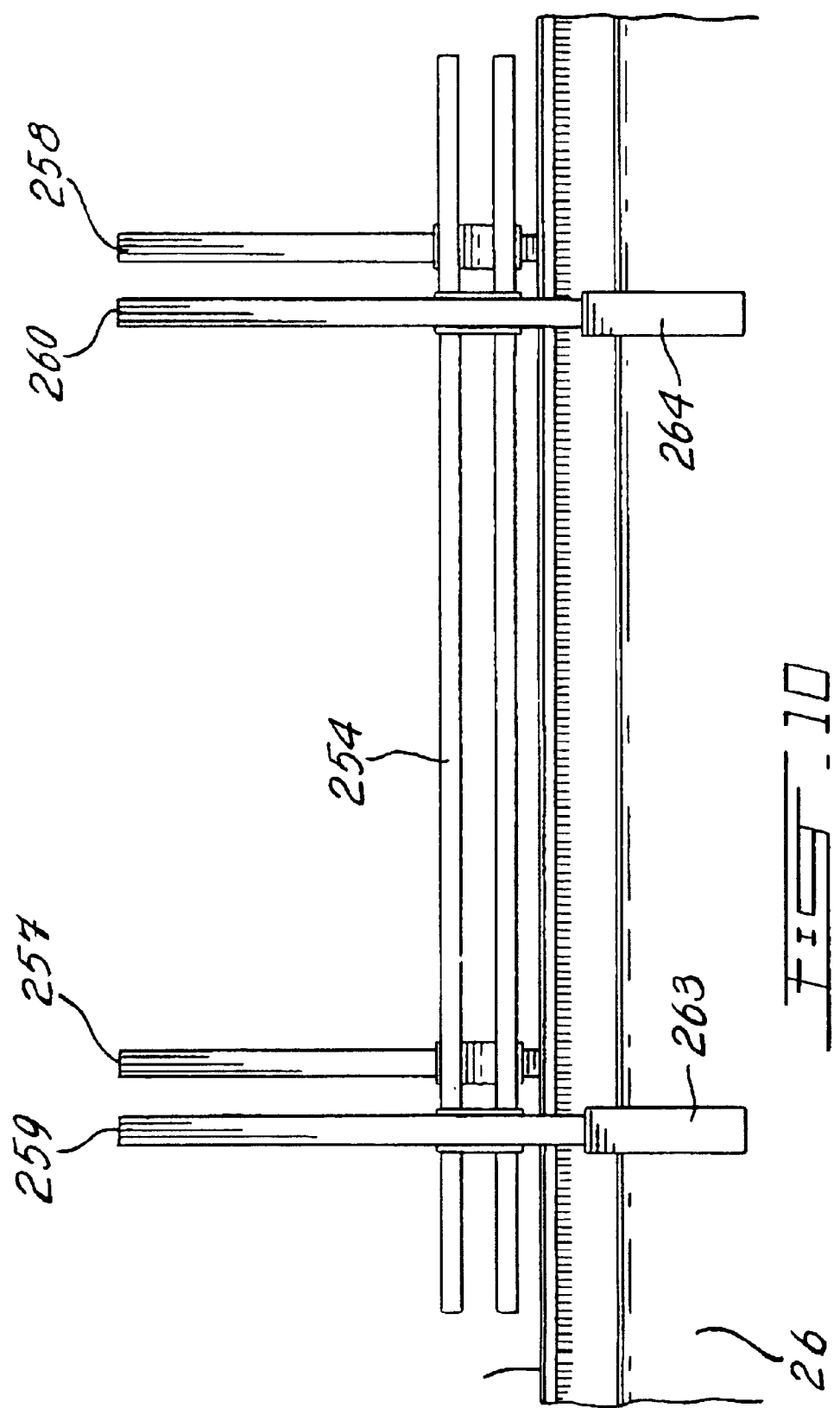
FIG. 10 is a side elevational view of the guide rail system of FIG. 8.

Referring now to FIG. 4 which is a cross-sectional view of the self-powered adjustable guide rail of FIG. 1, rails 21a and 21b each have rigid frame 81 wedged in a receptacle 82 by an angular peg 83 which is maintained in place by a screw 84 which extends through spacer 25 into a threaded hole in upright 24. Uprights 24 are rigidly connected to a pair of sliding arms 34. As shown in FIG. 4, sliding arms 34 have threaded ends 222 which extend into threaded bores in uprights 24 which have closely conforming sunk sockets 224 for the outer end portions 226 of the sliding arms 34. Sliding arms 34 are slidably supported and guided by bushings 36. This paired arrangement of bushings 36 and sliding arms 34 provides a stable supporting structure for uprights 24 and guide rail sections 20. A cam follower 38 interconnects sliding arms 34 at their inner ends so that both sliding arms 34 move together. Cam follower 38 engages a cam plate 40. FIG. 5 illustrates a cam plate 40 in isolation viewed from above. Cam plate 40 comprises a pair of diverging grooves 60, one for each uprights 24 and a pair of longitudinal grooves 62. It should be noted that diverging grooves 60 have the same angular deviation relative to the longitudinal axis defined by longitudinal grooves 62, although in opposite directions. This arrangement ensures equal lateral displacement of both cam followers 38 and of the guide rail sections 20 that they control.

As shown in FIG. 4, cam follower 38 engages cam plate 40 through one of the two diverging grooves 60. Cam plate 40 is maintained in a substantially parallel orientation relative to conveyor 220 by a passageway 42 cut out in bushings supporting members 44. Cam plate 40 is supported by the lower portion of passageway 42 to maintain cam plate 40 aligned with the central portion of cam follower 38. The assembly of cam follower 38 and cam plate 40 is positioned under conveyor belt 22 and is protected from possible spillage of containers 30 by shroud 46 surrounding the assembly yet providing access to it from opening 48. Shroud 46 can be made of any suitable material including, in particular, stainless steel metal.

Referring now to FIG. 6 which illustrate the self-powered adjustable guide rail system viewed through opening 48 of FIG. 4, an actuator 49, in the form of an stepping motor 50 having a threaded shaft 52, is rigidly mounted to supporting structure 26 and is connected to two cam plates 40 located at spaced apart location at opposite sides of actuator 49 via connecting bars 54. It can be seen that each cam followers 38 is confined to the adjacent one of the two diverging grooves 60 of cam plate 40. Longitudinal grooves 62 receive guide posts 56 which cause cam plates 40 to move in a straight line. Posts 56 can also serve to stop cam plates 40 when they reach the end of grooves 62.

When stepping motor 50 is activated, its rotational motion is transmitted to threaded shaft 52 which advances longitudinally thereby transforming the rotational motion of stepping motor 50 into a translatory motion along the longitudinal axis of conveyor 22. Threaded shaft 52, linked to cam plates 40 by connecting bars 54, imparts a linear translatory movement in the longitudinal direction, to cam plates 40. As cam plates 40 move longitudinally, diverging grooves 60 impart a lateral motion to cam followers 38. Cam plates 40 thereby act as motion converters transforming a movement in the longitudinal direction into a lateral movement. Cam followers 38 are pushed or pulled transversely by the motion of diverging grooves 60, sliding arms 34 transfer that transverse displacement to uprights 24 and to guide rail section 20 to adjust the position of each guide rail section relative to longitudinal centerline 28.

FIG. 6 illustrates the self-powered adjustable guide rail system in the position where each cam plate 40 reaches the end of its path in the direction of arrow 90. Each cam follower 38 is at, or near the end of a diverging groove 60 and the uprights 24 has been moved to the outermost position in the direction of arrows 100. From this position, the actuator system may be moved in the direction of arrow 91 to adjust guide rail sections 20 inwardly in the direction of arrows 101.

FIG. 7 illustrates another portion of the self-powered adjustable guide rail system which is normally linked to either end of the portion shown in FIG. 6. It should be noted that actuator 49 is absent and is replaced by a single connecting bar 54 linking each cam plate 40. It must be understood that a motorized actuator 49 is not required between each pair of cam plates 40. Connecting bars 54 link cam plates 40 together to form chains of cam plates 40 which are connected to both sides of an actuator 49. The number of cam plates 40 connected to a single actuator 49 is a function of the power of actuator 49 and of other design consideration. Hence, actuator 49 provides (((motivity))) to a chain of cam plates 40. Preferably, a chain of cam plates 40 operated by a single actuator 49 will be adapted to move independently of another chain of cam plates 40 operated by second actuator 49.

In FIG. 7, each cam plate 40 is at the end of its path in the direction of arrow 93, each cam follower 38 has been moved to the other extremity of a diverging grooves 60 and each upright 24 has been moved in the direction of arrows 105 to its innermost position. The self-powered adjustable guide rail system is in the position wherein each section of guide rail is at the closest distance from longitudinal centerline 28. From this position, the system may be moved in the direction of arrow 92 to adjust guide rail sections 20 outwardly in the direction of arrows 106.

In operation, actuator 49 receives an electrical signal and moves accordingly. The longitudinal motion of actuator 49 is transferred to connecting bars 54 which move each cam plate 40 of a chain of cam plates in one direction. The longitudinal displacement of cam plates 40 imparts a lateral motion to each cam follower 38 engaged in a diverging groove 60. Cam followers 38 push or pull sliding arms 34 which in turn move uprights 24 thereby moving guide rail sections 20 toward or away from longitudinal centerline 28.

A control system generates an electrical signal applied to actuator 49 in order to move guide rail sections 20 to the desired position relative to longitudinal centerline 28. The control system may be a simple manually operated push button or switch which sends an electrical signal to actuator 49 to move it in either direction or it may be a computer which has in memory data pertaining to various container sizes so that simply entering the code of the container will send an appropriate signal to the actuator 49 to move guide rail sections 20 to a pre-determined position relative to longitudinal centerline 28. The control system may be anything in between these two systems; the degree of sophistication of the control system being a matter of preference and necessity.

Stepping motor 50 is activated in one direction or in the other direction by pulse signals. Each pulse corresponds to a set incremental displacement of threaded shaft 52. For example: 1 pulse=1 mm. A preset number of pulses will provide the required movement of guide rail section 20. With a manually operated switch or a push button, the duration of the signal will determine the number of pulse whereas a more sophisticated control system will generate the exact number of pulses required to reach the desired position of guide rail sections 20.

In a more sophisticated control system, two types of encoders are available. An incremental encoder requires guide rail sections 20 to return to a Home or Zero position, normally the outermost position from longitudinal centerline 28 shown in FIG. 6, before sending a pre-determined number of pulses to actuator 40. An absolute encoder uses a feedback signal which determines the position of guide rail sections 20 so that pulses are sent to actuator 49 according to the difference between the initial position and the target position. Both types of encoder work well however, the absolute encoder is preferred as it moves guide rail section 20 directly to the target position and is therefore faster.

A variety of actuators 49 available on the market can readily achieve what stepping motor 50 in combination with threaded shaft 52 accomplishes. For example, a motorized linear actuator known as a motorized ball screw with feed-back potentiometer provides a reliable actuator allowing the position of its internal threaded shaft to be determined remotely. The signal of the potentiometer can be used to position guide rail sections 20 so that a signal corresponding to the difference between the initial position and the target position is sent to actuator 49. A servo motor may also be used which provides its own feedback signal and allows quick positioning of guide rail sections 20. The cost of servo motor however can be prohibitive in this application. An ordinary DC motor may also be used for this application although not with as much precision. The duration of the electrical signal sent to the ordinary DC motor determines the distance of travel in a given direction. The motor however will tend to coast slightly beyond the electrical signal cut off and this coasting has to be accounted for in the duration of the signal sent so that the target position of guide rail sections 20 will not be overshot.

As a variant of the self-powered adjustable guide rail system, it is possible to maintain one guide rail section 20 fixed relative to longitudinal centerline 28 and provide adjustment of the distance with the opposing guide rail section 20 by moving only one guide rail section. This may be particularly useful when a specific processing station has one side of the conveyor as a reference point and requires that containers enter the processing station with one of its sides always in the same position as opposed to a processing station that requires containers to enter with the center of the containers in the same position. To achieve this side alignment of containers, only one of the two guide rail section 20 has movable uprights, sliding arms and a cam follower in a groove 60 of a cam plate 40. The fixed guide rail section 20 may be mounted rigidly to the supporting structure 26 by any conventional means.

FIGS. 8, 9, 10 and 11 illustrate a second embodiment of a self-powered adjustable guide rail system. In this embodiment, the conveyor 230 has two lanes on each sides of centerline 28. The actuating mechanism located underneath the inverted U-shaped shroud 46 is identical to the previously described embodiment of the invention. Each guide rail section comprises a first and second guide rail. The right hand guide rail section comprises a first guide rail 251 located near the right outer edge of conveyor belt 225 and a second guide rail 253 located on the left hand side of centerline 28. Guide rails 251 and 253 are connected together and to uprights 261 and 262 by bridges 257 and 258. The left hand guide rail section comprises a first guide rail 254 located near the left outer edge of conveyor belt 225 and a second guide rail 252 located on the right hand side of centerline 28. Guide rails 254 and 252 are connected together and to uprights 261 and 262 by bridges 259 and 260. Bridges 257, 258 and 259, 260 extends upwardly from uprights 261, 262, 263, 264 to a point over and above conveyor belt 225, then laterally across conveyor belt 225 to a point beyond longitudinal centerline 28 of conveyor 230, and downwardly to a point near the surface of conveyor belt 225 where second guide rails 252 and 253 are attached. Second guide rail 253 is oriented in the same general direction as first guide rail 251 and second guide rail 252 is oriented in the same general direction as first guide rail 254. Each second guide rail 252 and 253 are retained and secured to the extremities of bridges 257, 258 and 259, 260 by a screw 280 located between the pair of rails defining second guide rails 252 and 253.

This dual lane arrangement defines two paths 241 and 242 for containers 30 being transported by conveyor belt 225. The right hand side of each path 241 and 242 is defined by guide rails 251 and 253 while the left hand side of each path 241 and 242 is defined by guide rails 252 and 254. Path 241 is thereby defined by guide rails 251 and 252 and path 242 is defined by guide rails 253 and 254. Guide rails 251 and 253 move in the opposite direction of guide rails 252 and 254. When the system is actuated, both guide rails 251 and 253 move in the same direction while both guide rails 252 and 254 move in the opposite direction thereby adjusting the width of both path 241 and 242 simultaneously.

Figure 11:
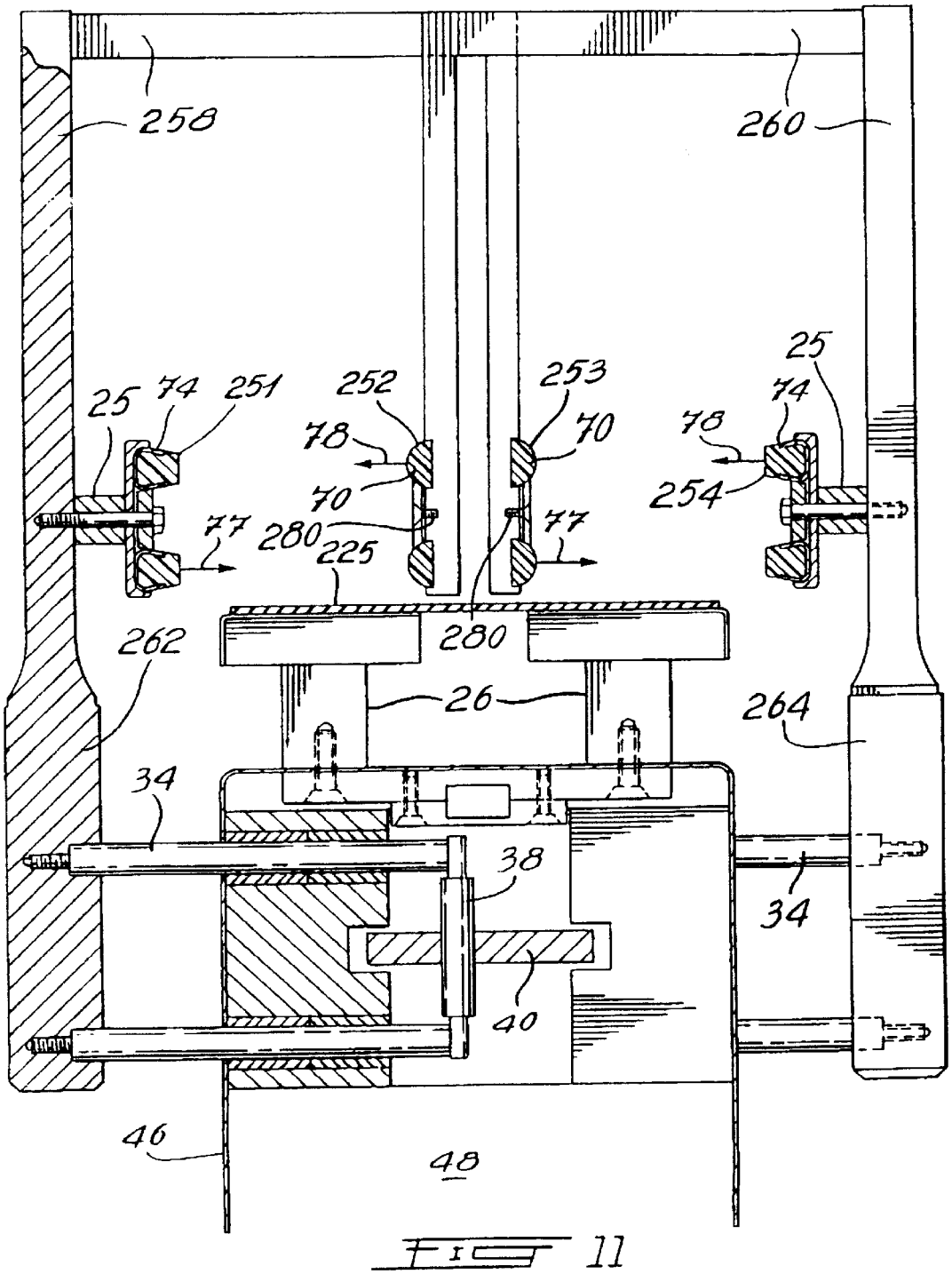
FIG. 11 is a sectional view taken along line 11—11 of the guide rail system of FIG. 9.

FIG. 11 show a cross-sectional view of the dual lane system. It can be seen that cam follower 38 engages cam plate 40 in the same manner as previously described and sliding arms 34 are connected to both ends of cam follower 38 on one side and to uprights 262 and 264 on the other side. The same assembly as previously described imparts motion to each uprights. Arrows 77 illustrate that first guide rail 251 and second guide rail 253 move in the one direction and arrows 78 illustrate that the opposing first guide rail 254 and second guide rail 252 move in the opposite direction.

All figures represent guide rail sections mounted on two uprights as a way of illustrating the invention. It is understood that each sections of guide rail may be longer and have more than two uprights without departing from the spirit of the invention.

The above description of preferred embodiments should not be interpreted in a limiting manner since other variations, modifications and refinements are possible within the spirit and scope of the present invention. The scope of the invention is defined in the appended claims and their equivalents.

We claim:

1. A self-powered adjustable guide rail system for guiding containers transported on a conveyor in a container processing production line, the conveyor having a longitudinal centerline, said adjustable guide rail system comprising:

at least two sections of guide rail, each section of guide rail for mounting on one side of the conveyor for guiding containers, said sections of guide rail being suitable for mounting to the conveyor in a generally parallel and facing relationship, and being adjustably movable toward the longitudinal centerline of said conveyor or away therefrom;

a motion converter coupled to said sections of guide rail; and a reversible motorized actuator in a driving relationship with said motion converter to impart to said motion converter a translatory motion along the longitudinal centerline of the conveyor;

said motion converter adapted to transfer the translatory motion along the longitudinal centerline into a translatory motion of said sections of guide rail generally transverse to the longitudinal centerline for moving said sections of guide rail toward the longitudinal centerline when said actuator operates in a first direction and for moving said sections of guide rail away from the longitudinal centerline when said actuator operates in a second direction.

2. A self-powered adjustable guide rail system as defined in claim 1, further comprising a control unit generating an output signal representative of the required motion of said sections of guide rail, said output signal being applied to said motorized actuator and causing same to move to a predetermined setting relative to the longitudinal centerline.

3. A self-powered adjustable guide rail system as defined in claim 2, wherein the control unit is a control system generating an output signal as a result of an input signal representative of the width of a container to be transported on the conveyor, said output signal being representative of an incremental actuation of said motorized actuator.

4. A self-powered adjustable guide rail system as defined in claim 3, wherein said control system comprises a processor, a data entry device and a memory unit adapted to store as data a plurality or container's width.

5. A self-powered adjustable guide rail system as defined in claim 1, wherein said motion converter comprises a cam member movable along the longitudinal centerline and having a pair of diverging grooves, said diverging grooves having the same angular deviation relative to the longitudinal centerline.

6. A self-powered adjustable guide rail system as defined in claim 5, wherein each section of guide rail comprises inwardly directed sliding members supporting said section of guide rail to the conveyor and cam followers linking said sliding members, said cam followers slidably engaging said diverging grooves to transmit motion of said cam member to said section of guide rail.

7. A self-powered adjustable guide rail system as defined in claim 6, wherein a plurality of cam members are rigidly linked to each other in a row substantially parallel to the longitudinal centerline and connected to at least one section of guide rail, at least one of said cam members being driven by said motorized actuator and adapted, in operation, to transfer its motion to an adjacent cam member.

8. A self-powered adjustable guide rail system as defined in claim 6, wherein said cam member further comprises at least one longitudinal groove substantially parallel to the longitudinal centerline, said longitudinal groove being engaged to a fixed member relative to the conveyor for guiding said cam member in a substantially rectilinear motion.

9. A self-powered adjustable guide rail system as defined in claim 8, wherein said cam member is adapted to transfer said rectilinear motion to said sections of guide rail in such a way that the displacement of said sections of guide rail is of equal distance but in opposite directions.

10. A self-powered adjustable guide rail system as defined in claim 6, wherein said reversible motorized actuator is adapted to transform rotational motion into translatory motion.

11. A self-powered adjustable guide rail system as defined in claim 10, wherein said reversible motorized actuator includes an electrical stepping motor and endless screw assembly.

12. A self-powered adjustable guide rail system as defined in claim 10, wherein said reversible motorized actuator includes an electric motor and rack and pinion assembly.

13. A self-powered adjustable guide rail system as defined in claim 10, wherein said reversible motorized actuator is located between two cam members.

14. A self-powered adjustable guide rail system as defined in claim 10, wherein said sections of guide rail are positioned at equal distance from the longitudinal centerline, thereby centering the containers being transported by the conveyor in the central axis of the conveyor.

15. A self-powered adjustable guide rail system as defined in claim 14, wherein each section of guide rail is mounted to a substantially upright member, said upright member being connected to one end of a pair of said sliding members, said sliding members passing through a pair of bushings mounted to a supporting structure of the conveyor, thereby supporting said section of guide rail onto said structure and permitting motion of said sliding members relative to the conveyor, said sliding members joined together at their other end by said cam follower, whereby when said cam member moves, said cam follower follows a path defined by one of said diverging grooves and transmits a motion to said sliding members.

16. A self-powered adjustable guide rail system as defined in claim 10, wherein each section of guide rail further comprises two generally parallel, side by side rails, both said sections of guide rail together defining two paths for the containers being transported.

17. A self-powered adjustable guide rail system as defined in claim 16, wherein one rail from each section of guide rail overlaps the other in the vicinity of the longitudinal centerline.

18. A self-powered adjustable guide rail system as defined in claim 1, wherein said motorized actuator and said motion converter are positioned underneath the conveyor.

19. A self-powered adjustable guide rail system as defined in claim 18, further comprising an impervious inverted U-shaped rigid shroud for protecting said motorized actuator and said motion converter from spillage of containers being transported.

20. A conveyor system for a container processing production line, said conveyor system comprising:
   a supporting structure;
   a conveyor belt mounted to said structure and movable along a longitudinal axis of said structure, said conveyor belt having a longitudinal centerline;
   at least two sections of guide rail disposed above said conveyor belt for guiding containers thereon, said sections of guide rail being supported by said structure in a generally parallel and facing relationship, and being adjustably movable toward the longitudinal centerline of said conveyor belt or away therefrom;
   a motion converter coupled to said sections of guide rail; and
   a reversible motorized actuator in a driving relationship with said motion converter to impart to said motion converter a translatory motion along the longitudinal centerline of said conveyor belt;
   said motion converter adapted to transfer the translatory motion along the longitudinal centerline into a translatory motion of said sections of guide rail generally transverse to the longitudinal centerline for moving said sections of guide rail toward the longitudinal centerline when said actuator operates in a first direction and for moving said sections of guide rail away from the longitudinal centerline when said actuator operates in a second direction.

21. A conveyor system as defined in claim 20, further comprising a control system generating an output signal as a result of an input signal representative of the width of a container to be transported on said conveyor belt, said output signal being applied to said motorized actuator and being representative of an incremental actuation of said motorized actuator and causing said sections of guide rail to move to a pre-determined setting relative to the longitudinal centerline.

22. A conveyor system as defined in claim 20, wherein each section of guide rail further comprises inwardly directed sliding members supporting said section of guide rail to said conveyor belt and cam followers linking said sliding members, said motion converter comprising a cam member movable along the longitudinal centerline and having a pair of diverging grooves, said diverging grooves having the same angular deviation relative to the longitudinal centerline, said cam followers slidably engaging said diverging grooves to convert motion of said cam member to said section of guide rail.

23. A conveyor system as defined in claim 22, wherein a plurality of cam members are rigidly linked to each other in a row substantially parallel to the longitudinal centerline and connected to at least one section of guide rail, at least one of said cam members driven by said motorized actuator and adapted, in operation, to transfer its motion to an adjacent cam member.

24. A conveyor system as defined in claim 23, wherein each section of guide rail is mounted to an upright member, said upright member connected to one end of a pair of said sliding members, said sliding members passing through a pair of bushings mounted to a supporting structure of said conveyor belt, thereby supporting said section of guide rail onto said structure and permitting motion of said sliding members relative to said conveyor belt, said sliding members joined together at their other end by said cam follower, whereby when said cam member moves, said cam follower follows a path defined by one of said pair of diverging grooves.

25. A conveyor system as defined in claim 24, wherein each section of guide rail comprises two generally parallel, side by side rails, both facing the same direction, both said sections of guide rail together defining two paths for the containers being transported.

26. A conveyor system as defined in claim 20, wherein said motorized actuator and said motion converter are positioned underneath the conveyor and protected from spillage of containers being transported on said conveyor belt by an impervious inverted U-shaped rigid shroud.

27. A self-powered adjustable guide rail system for guiding containers transported on a conveyor in a container processing production line, the conveyor having a longitudinal centerline said adjustable guide rail system comprising:
   at least one movable guide rail disposed above the conveyor for guiding containers thereon, said guide rail being adjustably movable transversely of the conveyor to accommodate containers of different configurations or sizes;

a motion converter coupled to said guide rail; and a reversible motorized actuator in a driving relationship with said motion converter to impart to said motion converter a translatory motion along the longitudinal centerline of the conveyor;

said motion converter adapted to transfer the translatory motion along the longitudinal centerline into a translatory motion of said guide rail generally transverse to the longitudinal centerline for moving said guide rail in one direction when said motorized actuator operates in a first direction, and for moving said guide rail in the other direction when said motorized actuator operates in a second direction.

28. A self-powered adjustable guide rail system for guiding containers transported on a conveyor in a container processing production line, the conveyor having a longitudinal centerline, said adjustable guide rail system comprising:

at least two sections of guide rail, each section of guide rail for mounting on one side of the conveyor for guiding containers, said sections of guide rail being suitable for mounting to the conveyor in a generally parallel and facing relationship, and being adjustably movable toward the longitudinal centerline of the conveyor or away therefrom;

a motion converter coupled to said sections of guide rail; and a reversible motorized actuator in a driving relationship with said motion converter to impart to said motion converter a translatory motion along the longitudinal centerline of the conveyor;

said motion converter comprising a cam member movable along the longitudinal centerline and adapted to transfer the translatory motion along the longitudinal centerline into a translatory motion of said sections of guide rail generally transverse to the longitudinal centerline for moving said sections of guide rail toward the longitudinal centerline when said actuator operates in a first direction and for moving said sections of guide rail away from the longitudinal centerline when said actuator operates in a second direction.

29. A conveyor system for a container processing production line, said conveyor system comprising:

a supporting structure;

a conveyor belt mounted to said structure and movable along a longitudinal axis of said structure, said conveyor belt having a longitudinal centerline;

at least two sections of guide rail disposed above said conveyor belt for guiding containers thereon, said sections of guide rail being supported by said structure in a generally parallel and facing relationship, and being adjustably movable toward the longitudinal centerline of said conveyor belt or away therefrom;

a motion converter coupled to said sections of guide rail; and a reversible motorized actuator in a driving relationship with said motion converter to impart to said motion converter a translatory motion along the longitudinal centerline of said conveyor belt;

said motion converter comprising a cam member movable along the longitudinal centerline and adapted to transfer the translatory motion along the longitudinal centerline into a translatory motion of said sections of guide rail generally transverse to the longitudinal centerline for moving said sections of guide rail toward the longitudinal centerline when said actuator operates in a first direction and for moving said sections of guide rail away from the longitudinal centerline when said actuator operates in a second direction.

* * * * *